United States Patent [19]
Walker

[11] Patent Number: 4,524,314
[45] Date of Patent: Jun. 18, 1985

[54] REAR TRAVEL GUIDANCE SYSTEM
[75] Inventor: Jack A. Walker, Sunnyvale, Calif.
[73] Assignee: PORTEC, Lisle, Ill.
[21] Appl. No.: 487,608
[22] Filed: Apr. 22, 1983
[51] Int. Cl.³ .............................................. G05D 1/00
[52] U.S. Cl. .................................... 318/587; 180/168
[58] Field of Search ............... 318/587, 580; 180/167, 180/168, 79.1; 364/424

[56] References Cited
U.S. PATENT DOCUMENTS

| | | | |
|---|---|---|---|
| 3,250,983 | 5/1966 | Atkinson | 318/587 |
| 3,498,403 | 3/1970 | Kohls | 180/168 |
| 3,614,990 | 10/1971 | Schnitzler | 180/168 |
| 3,737,887 | 9/1973 | Moore et al. | 318/587 |
| 3,738,443 | 6/1973 | Kubo | 318/587 |
| 3,750,017 | 7/1973 | Bowman | 324/247 |
| 3,993,156 | 11/1976 | Rubel | 318/587 |
| 4,043,418 | 8/1977 | Blakeslee | 180/168 |
| 4,079,801 | 3/1978 | Dobson | 180/168 |
| 4,247,896 | 1/1981 | Schnaibel | 180/168 |
| 4,258,813 | 3/1981 | Rubel | 180/168 |
| 4,456,088 | 6/1984 | Nishiki | 318/587 |

Primary Examiner—S. J. Witkowski
Assistant Examiner—Patrick C. Keane
Attorney, Agent, or Firm—Limbach, Limbach & Sutton

[57] ABSTRACT

An automatic guidance device for a self-powered cargo-moving vehicle operated by a vehicle-borne sensor which follows a buried, energized wire path and which includes sensor means mounted either between the fixed and steerable axles or in the front of the fixed axle of the vehicle for guiding the vehicle when it travels in a direction such that the fixed axle precedes the sensor by effectively generating a position error signal relative to the direction of travel, the position error signal provided by a pair of sensing coils whose outputs are combined to generate an error signal $V = K(R-F) + F$ where R and F are the differences of the output of a pair of rear sensor, and a pair of forward sensors, respectively, and K is equal to the ratio of the distance between the forward pair of coils and the virtual sense point to the distance of the rear and forward pairs of coils.

4 Claims, 4 Drawing Figures

REAR TRAVEL GUIDANCE SYSTEM

DESCRIPTION

1. Technical Field

This invention relates to guidance devices for self-powered vehicles and, more particularly, to a wire-following guidance device for an order-picking vehicle (OPV).

2. Background Art

In the material handling industry, high-rise OPVs permit narrow aisle storage and retrieval operations of non-palletized case or item storage. Such OPVs carry an operator on a lifting platform who picks orders from either a pallet or a storage module. The lifting platform incorporates a vehicle control so that the operator can ride on the platform. The aisle widths are extremely narrow and may be as narrow as four feet. In U.S. Pat. No. 4,043,418 to Blakeslee, a guidance system for an OPV is described which allows the operator to select between manual, power-steering guidance of the vehicle or automatic guidance of the vehicle. In the automatic guidance mode, the vehicle follows an energized wire which is buried in the floor over which the vehicle travels.

In many self-guidance vehicle systems, including the system described in the patent referred to above, the vehicle has a pair of wheels on a fixed, that is, non-steerable axle and a steerable wheel which is usually located in the front of the vehicle with respect to the normal direction of travel. The device for sensing the buried, energized wire then includes at least a pair of coils which straddle the wire and which are mounted on the vehicle ahead of the fixed axle. The purpose in mounting the coils ahead of the fixed axle is to obtain servo stability.

If it is desired to move the vehicle in the reverse direction in order to retain stability, it is then necessary to mount an auxiliary pair of sensor coils on the vehicle in a position such that they precede the fixed, non-steerable axle when the vehicle travels in the reverse direction. In the above-referenced patent, sensor means are provided for generating a position error signal relative to a virtual sense point to the rear of the vehicle to guide the vehicle when it travels in a reverse or backward direction along the path. A pair of forward sensor coils and a pair of reverse sensor coils are mounted on the vehicle so as to normally straddle the buried wire. Each pair of coils produces an output signal representative of the difference of the outputs of the coils of each pair. Means are provided for generating the position error signal (V) with respect to the virtual sense point according to the formula:

$$V = (1+K)R - KF$$

or $$V = R + K(R - F)$$

where

R = the difference of the outputs of the rear pair of sensor coils;
F = the difference of the outputs of the forward pair of sensor coils; and
K = a constant which equals the ratio of the distance between the rear pair of coils and the virtual sense point to the distance between the rear and forward pairs of coils.

As illustrated in FIG. 7a of the patent to Blakeslee, a complex circuit is required to generate the position error signal in accordance with the specified equation. It can be seen that a number of signals are required to be combined and weighted, and a number of switch closures must be implemented depending upon whether the vehicle is traveling in a forward or reverse direction. The complexity of the circuit for implementing the required equation adds to the cost of manufacturing a sensor guidance system, as well as increases the difficulty in the adjustment or alignment of the circuit. For example, in the transition between forward and reverse directions of travel, the appropriate coil amplifiers are gated on or off by a separate switch in order to provide the desired signal to the processing circuitry. This switching operation is in addition to the switching of a third term from the forward coil pair in or out of the processing chain depending upon the direction of travel of the vehicle.

Additionally, because the constant K is determined according to the physical separation of the front and rear sensor coil pairs and the virtual sense point, special care must be taken during assembly of the sensor coils to the vehicle to maintain precise placement of the coils.

DISCLOSURE OF THE INVENTION

The foregoing and other disadvantages of the prior art are overcome by the present invention of an improved, rear travel guidance system, for use in a self-guided vehicle of the type which automatically follows an externally defined path in a forward direction and which has, at least, one ground-engaging steerable wheel, including sensor means mounted on the vehicle for generating a position error signal representative of the position of the vehicle with respect to the path, steering motor means attached to the ground-engaging steerable wheel for steering the vehicle in response to a steering control signal to the steering motor means, and steering circuit means supplied with the position error signal for generating a first steering control signal for the steering motor means to cause the steering motor means to automatically steer the vehicle along the external path, and wherein the sensor means generate the position error signal relative to a virtual sense point to the rear of the vehicle to guide the vehicle when it travels in a backward direction along the path. The improvement of the invention comprises sensor means for generating the position error signal (V) relative to the virtual sense point according to the formula $$V = Q(R - F) + F$$

where

R = the difference of outputs of the rear pair of sensor coils;
F = the difference of outputs of the forward pair of sensor coils; and
Q = Constant = ratio of the distance between the front pair of coils and the virtual sense point to the distance between the front and rear pair of coils.

Means are provided for generating a difference signal which is representative of the difference between the output of the forward sensor coils and the output of the reverse sensor coils and which has been weighted by a predetermined quantity. Combining means are provided which are responsive to the output of the forward sensor coil and to the difference signal for providing the position error signal, wherein the position error signal corresponds to the output of the forward sensor coils when the vehicle traveling in a forward direction along the path, and corresponds to the sum of the output of the forward sensor coils and the difference signal when the vehicle is traveling in a reverse direction along the path.

Processing of the signals from the front and rear sensor coils in the manner of the present invention permits much simplified implementing circuitry. In the preferred embodiment, the output signal from the forward sensor coils is used unweighted in both the forward direction and reverse direction modes, while a weighted difference between the outputs of the forward and reverse sensor coils is additionally used in the reverse direction mode. This simplifies the circuitry required to place the various output signals of the sensor coils into a condition for use in determining the position error signal. Additionally, adjustment of any weighting of the signals is performed only in the reverse direction and only on one of the terms of the implementing equation. Furthermore, the system is made significantly less sensitive to any errors in the placement of the sensor coils on the vehicle.

Significant in the determination of the position error according to the present invention is the use of the ratio of the distance between front sensor coil and the virtual sense point to the distance between the the front and rear sensor coils. Use of this ratio simplifies the processing of the sensor coil outputs for use in the position error signal determination.

It is, therefore, an object of the present invention to provide a guidance device for a self-powered cargo moving vehicle which allows the vehicle to travel in a reverse direction with respect to a virtual sense point in accordance with a position error signal wherein the determination of the position error signal utilizes the unweighted output of the forward sensor coils for both the forward and backward directions of travel and further wherein a weighted difference between the front and rear sensor coil outputs is additionally utilized in the determination of the position error signal for travel in the backward direction.

It is another object of the present invention to provide a guidance device for a self-powered cargo moving vehicle which allows the vehicle to travel in the reverse direction relative to a virtual sense point in accordance with a position error signal wherein the sensitivity of the position error signal to errors in the placement of the sensing means is reduced.

The foregoing and other objectives, features and advantages of the invention will be more readily understood upon consideration of the following detailed description of certain preferred embodiments of the invention taken in conjunction with the accompanying drawings.

DETAILED DESCRIPTION OF THE INVENTION

U.S. Pat. No. 4,043,418 is hereby incorporated by reference.

Figure 1:
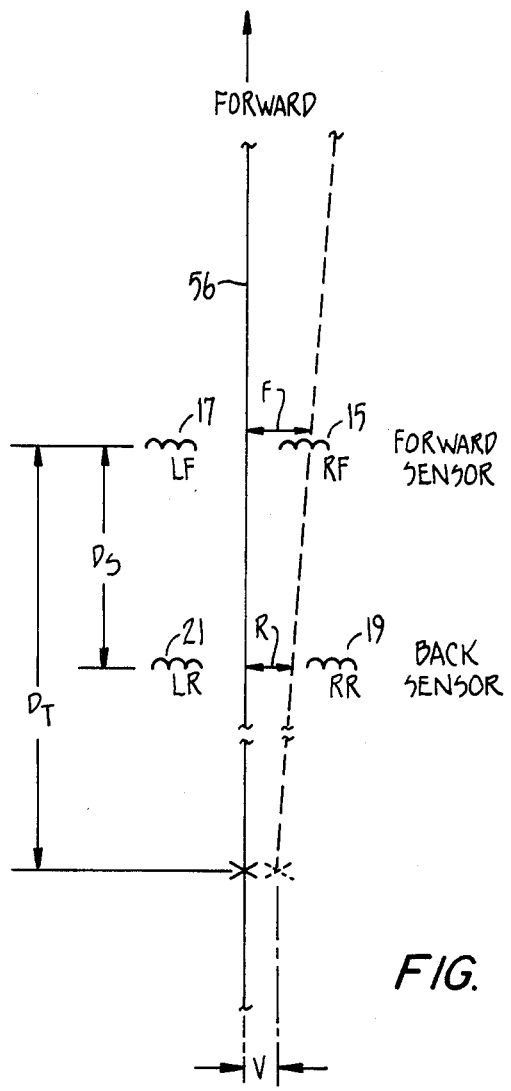
FIG. 1 is a plan, diagrammatic view of the sensor coil arrangement.
Figure 3:
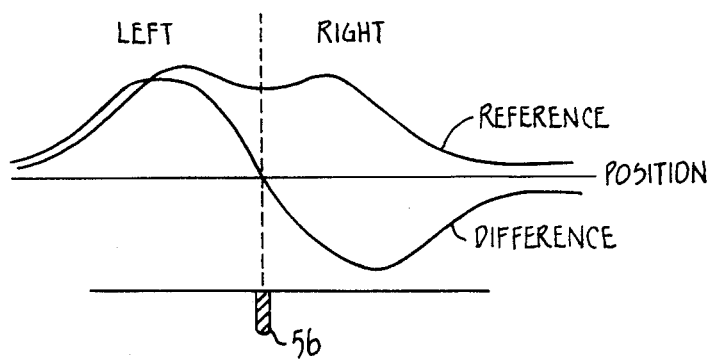
FIG. 3 is a waveform diagram of the output of each pair of sensor coils as a function of the position of the sensor coils with respect to the energized wire.
Figure 2:
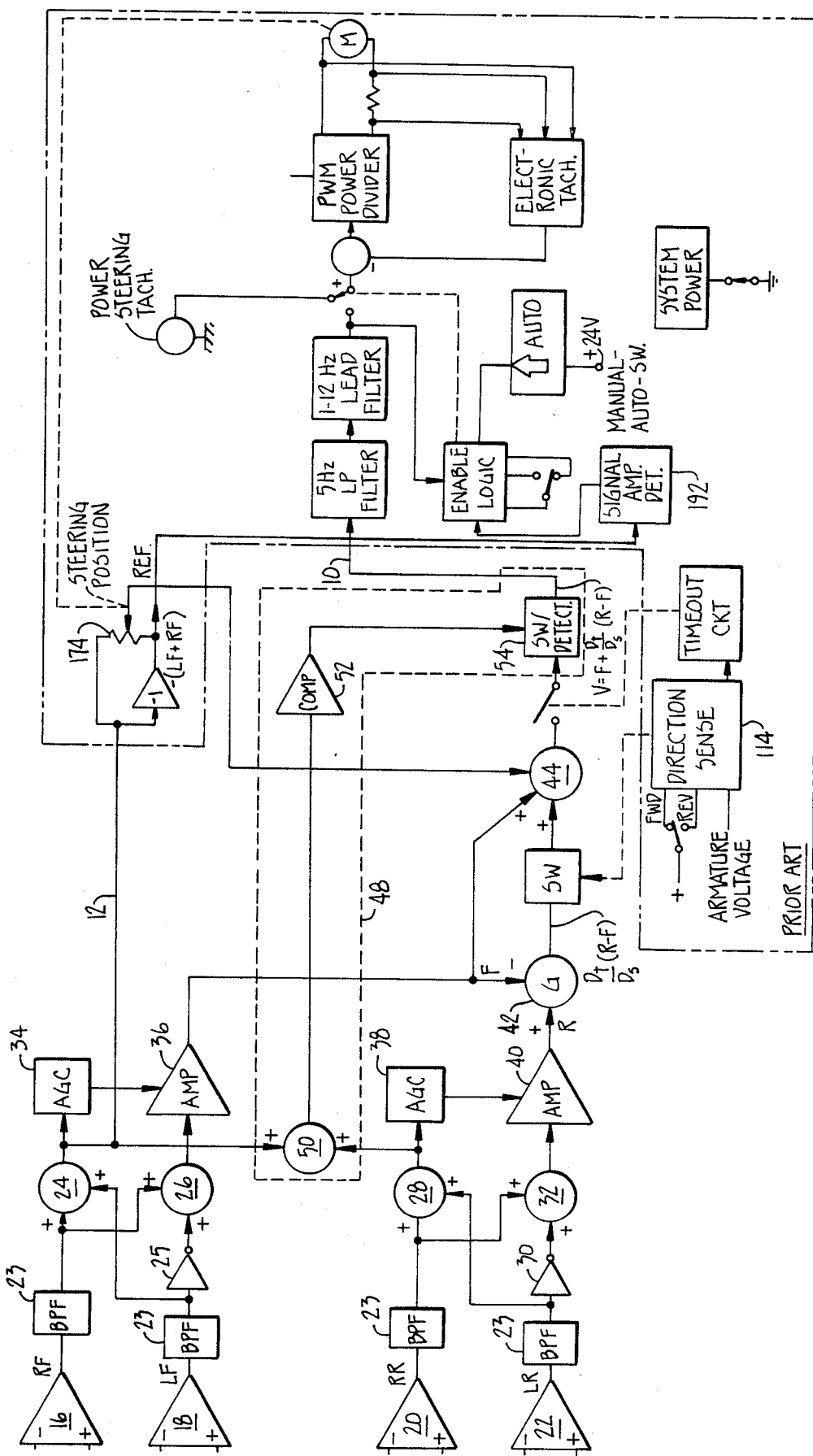
FIG. 2 is a simplified functional block diagram of the circuitry for deriving the error position signal from the sensor coil outputs.

An example of a typical application of the present invention is illustrated in FIGS. 1-3 of the above-referenced patent. There, an order picking vehicle (OPV) is shown which is guided along a path defined by a buried, energized wire. The OPV is supported by fixed, ground engaging roller wheels in the rear, and a steerable, ground engaging wheel at the front. A front sensing coil assembly is positioned on the bottom of the OPV and just behind the steerable wheel. A back or rear sensing coil assembly is positioned on the bottom of the OPV, spaced apart from the front sensing coil assembly, and between the front sensing coil assembly and the fixed rear roller wheels. Signals induced in each of the sensing coil assemblies due to the electromagnetic field generated by the energized wire are evaluated by processing circuitry. The processing circuitry thereby generates the error signal which represents the difference in position between the virtual sense point and the wire.

The error signal is then provided to steering circuitry which adjusts the position of the steerable wheel so that the direction of travel of the vehicle is modified so as to decrease the magnitude of the error signal.

In the above-referenced patent, it is disclosed that the error (V) in position between the virtual sense points along the path of the energized wire and that of the actual path of the vehicle can be determined by the formula $$V = (1 + D_v/D_s)R - (D_v/D_s)F \quad (1)$$

where F = the difference of the outputs of the pair of front sensor coils, R = the difference of the outputs of the pair of rear sensor coils, $D_v$ = the distance between the rear coil assembly and the virtual sense point, and $D_s$ = the distance between the rear and front coil assemblies.

Referring to FIG. 1, according to the present invention, it has been found that the error (V) can be defined differently, i.e. in terms of the distance between the virtual sense point and the front sensor coils, and in terms of the distance between the front and rear coils such that $$V = (D_t/D_s)(R - F) + F \quad (2)$$

where, F = the difference of the outputs of the front sensor coils, R = the difference of outputs of the rear sensor coils, $D_t$ = the distance between the front sensor coil and the virtual sense point, and $D_s$ = the distance between the front and rear sensor coils. For example, if the distance $D_s$ between the front and rear coil assemblies is two feet, and the virtual sense point is ten feet behind the rear coil assembly, the total distance $D_T$ would equal 12 feet. Thus, $D_t/D_s$ equals twelve divided by two or six. Typically, this ratio ranges from between one to ten.

By the substitution, for the means for generating the position error signal in the above-referenced patent, of means for generating the error signal according to equation (2) above, a new and improved guidance system is obtained.

A comparison of the error equation (1) from U.S. Pat. No. 4,043,418 to equation (2) of the present invention reveals several advantages provided by a position error sensor which incorporates the latter equation. First of all, in the latter equation, it can be seen that two terms are used, the first term being the output of the front sensor coils alone and unweighted, and the second term being a weighted difference between the outputs of the rear coils and the outputs of the front coils. Thus, the circuitry for implementing this reverse direction error signal equation can also be utilized to provide the error signal in the forward direction of travel, since the error signal there is the difference in the forward coil sensor outputs. In the forward direction of travel, the second term would be gated off and only the first term used. In the reverse direction of travel, both terms would be used.

An additional advantage of the present invention is that the error contributions due to the inexact placement of the rear coil is significantly reduced. In the past it has been found that when a rear coil guidance system is constructed according to the Blakeslee patent, the exact placement of the rear coil is a critical element in the proper alignment and adjustment of the system. Additionally, because the rear coil placement often differs with different types or models of vehicles, a generalized compensation scheme for such errors in rear coil placement is made even more difficult. A comparison of the error position equations indicates that in equation (1), the constant K is the ratio of the distance, $D_v$, between the rear coil pair and the virtual sense point to the distance, $D_s$, between the rear and front coil pairs. If the rear coil were mispositioned in a direction toward the virtual sense point by an amount E, it can be shown that the constant K would have an error defined by the equation:

$$\left(1 + \frac{D_s}{D_v}\right) \frac{E}{D_s - E} \quad (3)$$

In contrast, equation (2) requires that the constant Q correspond to the ratio of the distance, $D_t$, between the front sensor coil pair and the virtual sense point to the distance, $D_s$, between the front and rear pairs of coils. It can be shown that the error in the constant Q for the same amount E of mispositioning of the rear sensor coils would be defined by the equation:

$$\frac{E}{D_s - E} \quad (4)$$

It is, therefore, immediately apparent that the rear coil placement error will have a greater impact upon the constant K in the Blakeslee patent than upon the constant Q in the present invention, i.e., by a factor of $D_s/D_v$. Thus, for example, if $D_v$ equals 10 and $D_s$ equals 12, the error in the constant K in the Blakeslee patent will be twenty percent greater than the corresponding error in the constant Q of the present invention. It is also apparent that the choice of the relative location of the rear coil pair between the front coil pair and virtual sense point will contribute to the impact of the rear coil placement error on the constant K in the Blakeslee patent, but not on the constant Q in the present invention.

Referring to FIG. 2, the manner in which equation (2) is implemented will now be described. It is to be understood that the circuitry of FIG. 2 can be substituted for the circuitry shown in FIG. 7a of the above referenced U.S. patent so that it operates in conjunction therewith.

In FIG. 2 circuitry from FIG. 7b of the referenced patent is shown connected as it would cooperate with the circuitry of the present invention. Output line 10 in FIG. 2 supplies the error signal to the 5 Hz low pass filter 184 in FIG. 7b of the above-referenced patent. Additionally, line 12 in FIG. 2 supplies the signal to the reference amplifier 172 in FIG. 7b of the above-referenced patent. The signal on line 14 in FIG. 2 is supplied from the direction sense block 114 in FIG. 7a-7b of the above-referenced patent. Finally, a negative feedback signal from the wiper of potentiometer 174, in FIG. 7b of the referenced patent, is added to the error position signal at summing point 44 to provide closed-loop servo control as described in the referenced patent.

In the circuit of FIG. 2, signals from the right and left coils of the pair of front sensor coils 15 and 17 are received and amplified by differential amplifiers 16 and 18, respectively. Similarly, signals from the right and left coils of the rear sensor coils 19 and 21 are received and amplified by differential amplifiers 20 and 22, respectively.

For both sets of sensor coils, the signals are summed together to provide a reference signal and subtracted from one another to provide a difference signal after being filtered by band pass filter 23. With respect to the front sensor coils, the right front signal and the left front signal are summed together in summing point 24 to provide a front reference signal. The left front signal is inverted by inverter 26 and then subtracted from the right front signal in summing point 26 to form the front difference signal.

With respect to the rear sensor coils, the signals from the right rear and left rear coils are added together in summing point 28 to provide a rear reference signal. The left rear signal is inverted by inverter 30 and then subtracted from the right rear signal in summing point 32 to form the rear difference signal.

The front coil and rear reference signals are utilized for two purposes: (1) for use in the automatic gain control (AGC) of their respective difference signals, and (2) for use in the synchronized detection of the error signal by which it is determined to which side of the energized wire the vehicle is positioned. The latter function will be described in greater detail hereinafter.

The front reference signal summing point 24 is evaluated by AGC circuit 34 which provides a gain signal to amplifier 36. The input to amplifier 36 is the difference between the right front and left front coil signals, supplied from summing point 26. The gain signal from AGC circuit 34 will adjust the gain of amplifier 36 as a function of the magnitude of the front reference signal to thereby normalize the difference signal from amplifier 36. Such an AGC feature can be obtained using commercially available integrated circuits, such as the compandor integrated circuit number NE570 manufactured by Signetics Corporation of Sunnyvale, Calif. In such an implementation, an automatic level control circuit is constructed except that the control signal for the level adjustment is derived from the front reference signal of summing circuit 24, instead of from the input voltage which is to be controlled. (See Signetics, Analog Division, Circuit Description and Applications for NE570/571/SA571, May 1981, p. 12, FIG. 32). As the magnitude of the front reference signal increases, the gain of the amplifier decreases, and vice versa, so that the gain applied to the difference signal is normalized to the reference signal.

In a similar manner, AGC circuit 38 receives the rear reference signal from summing point 28 to control the gain of amplifier 40. Amplifier 40 amplifies the difference in the right rear and left rear signals as supplied from summing point 32.

Thus, the output of amplifier 36 represents the gain-controlled difference between the outputs in the forward pair of coils while the output of amplifier 40 represents the gain-controlled difference in the outputs of the rear pair of coils. These difference signals are supplied to summing point 42. Summing point 42 subtracts the forward difference signal from the rear difference signal and then weights this difference by a predetermined quantity (Q). It is to be understood that summing point 42 can be a differential amplifier which receives the forward difference signal at its inverting input, the rear difference signal at its non-inverting input, and the gain of which is adjusted to correspond to Q. The output of summing point 42 corresponds to the second term of equation (2); i.e., $Q(R-F)$, where $Q=D_t/D_s$. This signal is supplied to summing point 44 via switch 46.

The output from amplifier 36 is also supplied to summing point 44. Depending upon the direction of travel of the vehicle, the weighted difference between the front and rear difference signals from summing point 42 will be added in summing point 42 to the front difference signal from amplifier 36. Switch 46, which is controlled by a reverse direction indication on line 14, connects or disconnects the output of summing point 42 to summing point 44. The output of summing point 44 thus provides the error position signal for both forward and reverse directions of travel of the vehicle.

In operation, therefore, a minimum amount of signal processing is required in order to derive the error position signal for both the forward and reverse directions of vehicle travel. There is no requirement that coil signal amplifiers be AGC'd off and on. In the forward direction of travel, the difference between the output signals of the forward sensor coils is used as-is. In the reverse direction of travel, the difference between the reverse and forward difference signals is determined and is then weighted by a constant determined by the ratio of the distance between front and rear sensors to the distance between the the front sensor and the virtual sense point. This weighted difference quantity is supplied to summing point 44 for addition to the forward sensor coil output upon the closure of switch 46. Switch 46 is typically an analog solid state switch which closes upon an appropriate signal supplied on line 14. As discussed above, a reverse or forward direction signal is provided by a direction sense circuit (114 in FIG. 7b) of the referenced patent which monitors the armature voltage on the drive motor for the vehicle.

Also required for proper automatic guidance of the vehicle is an indication of on which side of the wire the vehicle is located. In the above-referenced patent, a synchronized detection circuit is discussed which involves the use of a differential amplifier which is supplied with the error position signal and with a reference signal derived from the front coils only. In the present invention, synchronized detection is implemented differently. Referring to FIG. 2, the circuitry encompassed by dotted line 48 provides a synchronized detection function which, in turn, provides an indication of the position of the path of the vehicle with respect to the path of the energized wire.

In synchronized detector 48 reference signals from both the front and rear pairs of sensor coils are utilized. Summing point 50 receives the front reference signal from summing point 24 and the rear reference signal from summing point 28 to provide a signal which is representative of the sum of the coil outputs from both the front and rear coils. Comparator 52 receives the output of summing point 50 and, in response thereto, squares-up the signal to generate a switching control signal. This switching control signal is provided to switch/detector 54. Switch/detector 54 receives at its input the error position signal from summing point 44. In response to the switching control signal, switch/detector 54 provides selected portions of the input waveform at its output on line 10. These selected portions are inverted or supplied as-is depending upon their relation to the rate of the switching control signal.

Figure 4:
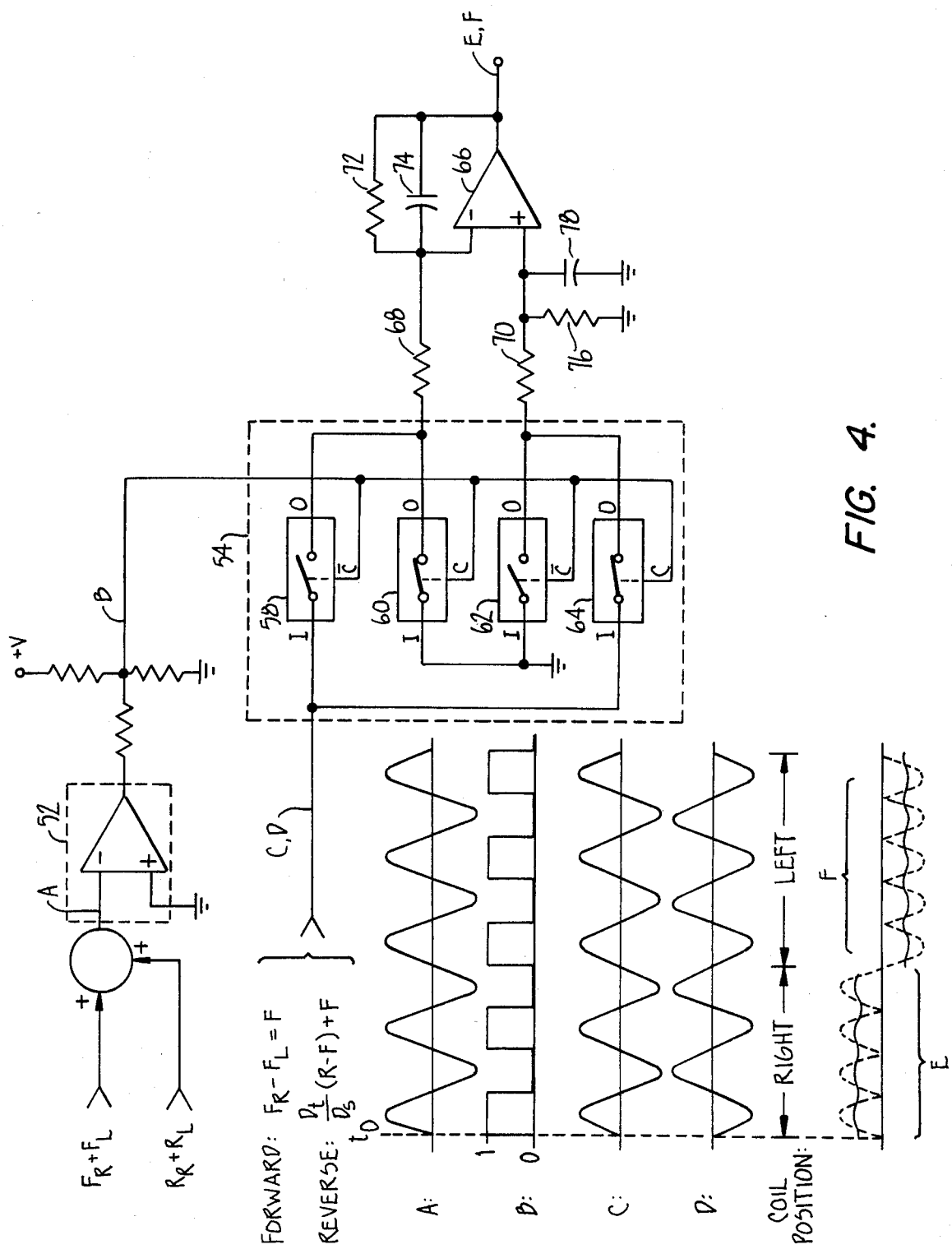
FIG. 4 is a detailed schematic of the synchronizing circuit.

Referring to FIGS. 3 and 4, the effect of this selective switching operation upon the error position signal will be discussed in greater detail. In FIG. 3, two waveforms are shown. The waveform labelled "reference" illustrates the magnitude of a reference signal, i.e., the sum of the right and left coil outputs of a sensor pair, as a function of the position of the sensor pair with respect to the energized wire 56. Thus, the magnitude of the reference signal is substantial when the sensor pair is centered over the energized wire 56. When the sensor pair is moved off center from the wire 56, one of the pair of coils is brought into closer proximity with the energized wire 56, while the other of the pair is moved further away from the wire 56. The signal in the former coil peaks as it is positioned directly over the wire, while the signal from the latter coil decreases correspondingly. As the sensor pair moves further and further away from the energized wire 56 the magnitude of the reference signal decreases. When the sensor pair is centered over the energized wire 56, there is a slight dip in the reference signal amplitude. Not available from this waveform is an indication of on what side of the wire the sensor pair is located.

The second waveform is labelled "difference". This waveform represents the phase and the magnitude of the difference between the right and left output signals of the coil pair with respect to the reference signal. Thus, it can be seen that, when a coil pair is offset toward the left of the energized wire 56, the difference signal is in-phase with respect to the reference signal. Conversely, when the sensor pair is to the right of the energized wire 56, the difference signal is of out-of-phase with respect to the reference signal.

Because the coil signals typically are alternating current waveforms, the "sign" of the difference signal is in terms of its phase with respect to the reference signal, as opposed to a negative or positive sign. The difference signal changes "phase" as a function of the position of the sensor pair with respect to the energized wire 56. When the energized pair is positioned toward the left side of the wire, the difference signal is "in-phase" with the reference signal while, when the sensor pair is toward the right side of the wire, the difference signal is "out-of-phase" with respect to the reference signal.

The synchronized detector circuit 48 utilizes this phase reversal in the difference signal to provide a position indication at the output of switch/detector circuit 54. Referring to FIG. 4, the manner in which this is accomplished will be described in greater detail. It is to be understood that, in the preferred embodiment of the present invention and as discussed in the above-referenced patent, the energized wire carries an AC signal. Thus, the outputs of the sensor coils will be AC signals, as will be the output of summing point 44. Typically, these AC signals will be sinusoidal in nature. Comparator 52 converts the sinusoidal reference signal from summing point 50 into a logic or digital format. Comparator 52 has a threshold which is to ground and, therefore, is a zero-crossing detector. As shown in FIG. 4, comparator 52 generates a positive-going voltage whenever the reference waveform is less than zero, and a zero voltage whenever the waveform is greater than zero. This digital waveform is then applied to the control terminals of switches 58, 60, 62 and 64 of switch 54.

Switch 58 and switch 64 each receives at its input the error position signal from summing point 44. Switches 60 and 62 have their inputs connected to ground. The outputs of switch 58 and switch 60 are connected to the inverting input of differential amplifier 66 via resistor 68. Similarly, the outputs of switch 62 and switch 64 are connected to the non-inverting input of differential amplifier 66 through resistor 70. Feedback resistor 72 and capacitor 74 are connected between the output and the inverting input of differential amplifier 66. while feedback resistor 76 and capacitor 78 are connected between the output and the non-inverting input or differential amplifier 66.

Switches 58 and 62 are closed when the output from comparator 52 is at a logic zero level, e.g. zero volts. When this occurs, the non-inverting input to differential amplifier 66 is connected to ground via resistor 70 and closed switch 62; while the error position signal is supplied to the inverting input of differential amplifier 66 through resistor 68 and closed switch 58. The portion of the error position signal being supplied to differential amplifier 66 during this time period appears inverted at the output thereof.

Conversely, when the output of comparator 52 is at a logic one, switches 58 and 62 are open, while switches 60 and 64 are closed. When this occurs, the inverting input of differential amplifier 66 is connected to ground via resistor 68 and closed switch 60. On the other hand, the non-inverting input to differential amplifier 66 is connected to the error position signal through resistor 70 and closed switch 64 so that the error position signal portion appears without inversion at the output. Connection and control of the switches in switch 54, as described above, provides a full wave rectification function, the polarity of which is determined by the phase of the error position signal with respect to the reference signal.

Referring to the waveforms in FIG. 4, the above will be described in greater detail. The waveform A illustrates the reference waveform from summing point 50 with respect to an arbitrary point in time designated by $t_0$. The waveform B illustrates the output of the comparator 52 referenced to the same arbitrary point in time, $t_0$. The waveforms C and D illustrate the phase of the error position signal from summing point 44, FIG. 2, as a function of the position of the sensor pairs toward the right or left of the energized wire 56. Curve C corresponds to a position toward the right while waveform D corresponds to a position toward the left. These waveforms are both referenced to the same arbitrary point in time as the reference signal, $t_0$. As can be seen from the waveform D, the error position signal is 180° out-of-phase with respect to the reference signal A. On the other hand, the error position signal waveform C is in-phase with the reference signal A.

For purposes of illustration, assume that the sensor pair is located to the right of the energized wire 56 so that waveform C applies, and that switches 58 and 62 close when waverorm B is at a logic zero level and open with the waveform is at logic one level. Assume that the converse is true for switches 60 and 64. It can be seen that switches 58 and 62 will be closed when the error position signal, waveform C, is negative-going. This negative-going portion, when fed to the inverting input of differential amplifier 66, will provide a positive-going output. Similarly, switches 60 and 64 will be closed when the error position signal, waveform C, is positive-going to provide the signal to the non-inverting input of differential amplifier 66 The resulting output will also be positive-going. The result is shown at the output of differential amplifier 66 as a full-wave rectified signal having a positive polarity, waveform E, dotted curve. Feedback resistor 72 and capacitor 74 act to filter the higher frequency components from the output waveform so that a DC voltage having a positive polarity is provided at the output of differential amplifier 66 when the sensor pair is located to the right of the energized wire 56.

In a similar manner, when the sensor pair is located toward the left or the energized wire 56 so that waveform D applies, a negative DC voltage is supplied at the output of differential amplifier 66. Briefly, when the error position signal is positive, switches 58 and 62 will be closed, thereby providing a positive waveform to the inverting input of differential amplifier 66. This results in a negative-going output. Similarly, when the error position signal is negative-going, switches 60 and 64 will be closed to provide a negative-going signal to the non-inverting input of differential amplifier 66, thereby resulting in a negative-going output.

In the present invention, the reference signal is generated from the sum of the outputs from all of the coils so that the synchronized detection feature will be available even when only one of the coils is positioned in the vicinity of the path of the energized wire 56. In the above-referenced patent, the outputs of only the forward coils were summed together to provide the synchronized detection feature. Thus, when the forward coils were positioned well-off of the path of the energized wire, resulting in a potentially noisy reference signal, no synchronized detection could be provided.

The present invention, therefore, implements a more efficient determination of the error position signal. The complexity of the required circuitry is thereby reduced as is in the need for precision components in the system. In the present invention, it is recognized that, by geometric construction, the error position signal can be derived as a function of the front and rear coil sensor outputs and the ratio of the distance between the front and rear sensor pairs to the distance between the virtual sense point and the front sensor pair. Also provided is an improved means for synchronized detection in the error position signal of the position of the vehicle with respect to the path of the energized wire 56.

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

I claim:

1. An improved, self-guided vehicle of the type which automatically follows an externally defined path, and which has a ground-engaging steerable wheel, sensor means mounted on the vehicle for generating a position error signal representative of the position of the vehicle with respect to the path in the forward direction and representative of the position of a virtual sense point and the path in the reverse direction, the sensor means comprising a pair of front sensors and a pair of rear sensors, each pair of sensors being mounted on the vehicle so as to normally straddle the path and each pair producing a sensor pair signal which is representative of the difference of the outputs of the particular pair of sensors, and steering actuator means attached to the ground engaging steering wheel and responsive to the position error signal to control the orientation of the steerable wheel to automatically steer the vehicle along the external path, wherein the improvement comprises means for generating a difference signal which is representative of the weighted difference between the front sensor pair signal and the rear sensor pair signal wherein the difference has been weighted by a predetermined quantity; and means for combining the sensor pair signal from the forward sensors with the difference signal so that the position error signal corresponds to the front sensor pair signal when the vehicle is traveling in a forward direction along the path and corresponds to the sum of the front sensor pair signal and the difference signal when the vehicle is traveling in a reverse direction along the path.

2. An improved, self-guided vehicle of the type which automatically follows an externally defined path and which has a ground-engaging steerable wheel, sensor means mounted on the vehicle for generating a position error signal representative of the position of the vehicle with respect to the path in the forward direction and representative of the position of a virtual sense point and the path in the reverse direction, the sensor means comprising a pair of front sensors and a pair of rear sensors, each of the pairs of sensors being mounted on the vehicle so as to normally straddle the path and each pair of sensors producing a sensor pair signal which is representative of the difference of the outputs of the particular pair of sensors, steering actuator means attached to the ground engaging steering wheel and responsive to the position error signal to control the orientation of the steerable wheel to automatically steer the vehicle along the external path, wherein the improvement comprises sensor means for generating the position error signal relative to the virtual sense point to the rear of the vehicle when it travels in a backward direction along the path wherein the sensor means generates the position error signal (V) relative to the virtual sense point according to the formula $$V = Q(R - F) + F$$

where

R = sensor pair signal from the rear pair of sensors;
F = sensor pair signal from the forward pair of sensors; and
Q = constant = ratio of the distance between the front pair of sensors and the virtual sense point to the distance between the front and rear pairs of sensors.

3. The apparatus in claim 1, wherein the predetermined quantity by which the difference between the sensor pair signal of the forward sensors and the sensor pair signal of the reverse sensors is weighted in the difference signal generating means corresponds to the ratio of the distance between the front pair of sensors and the rear pair of sensors to the distance between the front pair of sensors and the virtual sense point.

4. The apparatus in claim 2, wherein the error position signal and each of the sensor output signals are alternating current signals having the same frequency, and further wherein the sensor means further include means for detecting on which side of the external path "the vehicle" is positioned comprising means for generating a reference signal which is representative of the sum of the sensor pair signals from the front sensor coils and the rear sensor coils;

comparator means responsive to the reference signal for providing a logic one level whenever the reference signal exceeds a predetermined threshold level and for providing a logic zero level whenever the reference signal is less than the threshold level; and switching means responsive to the logic levels from the comparator means and to the position error signal for providing an output signal which corresponds to a non-inverted position error signal when the output of the comparator means is the logic one level and which corresponds to an inverted position error signal when the output of the comparator means is the logic zero level so that the output of the switching means is at a first polarity when the vehicle is on one side of the energized wire and a second opposite polarity when the vehicle is in the opposite side of the energized wire.

* * * * *